Feb. 9, 1932.      C. S. BRAGG ET AL      1,844,632
POWER ACTUATOR
Filed Sept. 16, 1927      3 Sheets-Sheet 1
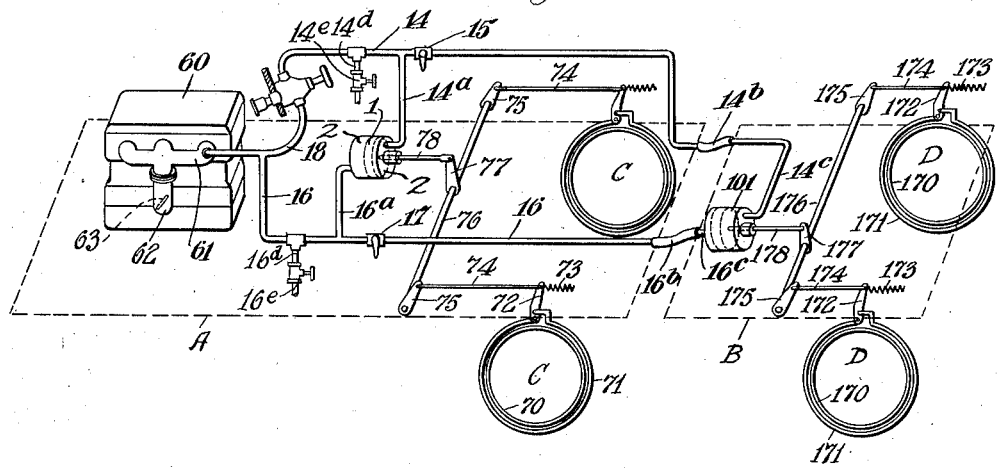

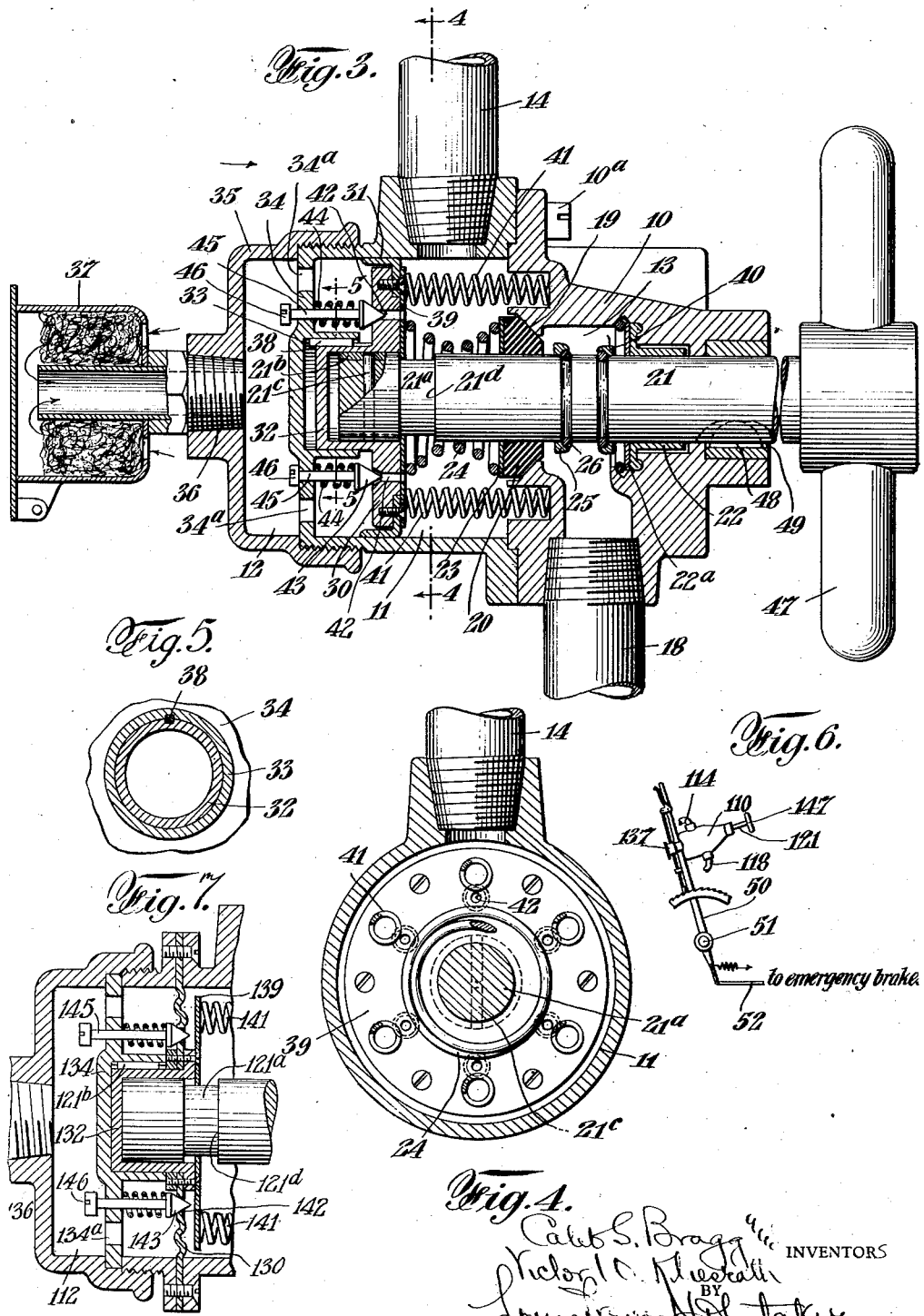

Patented Feb. 9, 1932

1,844,632

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

POWER ACTUATOR

Application filed September 16, 1927. Serial No. 219,873.

Our invention consists in the novel features hereinafter described, reference being had to the accompanying drawings, which illustrate one embodiment of the same, selected by us for the purposes of illustration, and the said invention is fully disclosed in the following description and claims.

Our present invention consists in an improvement in brake mechanism, and consists in the combination, with one or more power actuators operatively connected with certain brake mechanism of the vehicle, or vehicles, as a tractor and trailing vehicle, of valve mechanism located exterior to the actuator or actuators controlled thereby, and comprising a valve casing which may be connected with the dash or instrument board, or other part not connected with the actuators or brake mechanisms operated thereby, and movable controlling members operated conveniently by hand, for example, for connecting the actuator cylinder, or cylinders on opposite sides of the piston therein with sources of higher and lower pressures and including a movable valve seat member having portions in sealing engagement with the valve casing and provided with an inlet aperture surrounded by a valve seat for engaging an inlet valve, or preferably with a plurality of inlet apertures and valve seats for engaging a plurality of inlet valves, said valves being movable with respect to the valve casing, and the valve seat member, but having their relative movement with respect to the casing limited, and in the case of a plurality of such valves limited by means causing them to be opened in succession, so that in the movement of the valve seat member in a direction to open the connection between the actuator cylinder or cylinders and the source of higher pressure, the higher pressure fluid will be gradually admitted. The valve seat member is provided with yielding resistance means interposed between it and a part connected with the valve casing, and having sufficient power to offer material resistance to the movement of the valve seat member in a direction to open the higher pressure valves, when the opposite faces of the valve seat member are exposed to substantially equal fluid pressures, the valve seat member being provided with opposite faces of substantially equal area normally exposed to the higher and lower fluid pressures respectively when the valve is in closed position, the higher fluid pressure being exerted upon the valve in a direction opposite to the resistance means and being sufficient to nearly counterbalance the pressure of said resistance means when the valve is closed, so that the resistance means will exert little pressure on the valve seat member to resist its initial opening movement and the opening movement of the valve seat member will tend to equalize pressures on the opposite faces and transfer the pressure of the said resistance means to the operator in proportion to the decrease of differential in the fluid pressures on opposite faces of the valve seat member and pistons in cylinders controlled thereby, so as to enable the operator to determine by the gradually increasing resistance which he must sustain in order to hold the higher pressure valve open, or further open it, the extent to which the pressure on the brake mechanism is being applied by the power actuator or actuators. Our invention also comprises means whereby the higher pressure valve seat member may be permitted to return to closed position at any time against an arresting stop connected with the valve casing relieving the operator from the necessity of sustaining pressure of said resistance means, and even permitting him to remove his hand from the operator operated part connected with said valve seat member without releasing the accumulated pressure in the cylinder or cylinders, so as to hold the brakes as applied, the pressure within the cylinders being equalized by an inward movement of the operator operated part to open the connection between the cylinder or cylinders and the source of lower pressure, and permit the brake mechanism operatively connected with the pistons of the actuators to be released or returned to their normal positions by the usual retracting means therefor.

In the embodiment of the invention herein shown and described, we have illustrated the valve mechanism in connection with cylinders in which the pistons are normally maintained in vacuum when the valve mechanism, pistons and brake mechanism are in the off or retracted positions, and the higher and lower pressures relied upon for the operation of the actuator pistons are respectively the atmosphere, and rarification or partial vacuum obtained by connection with the suction passage of the internal combustion engine for propelling the vehicle, or vehicles.

In the accompanying drawings,

Fig. 1 is a diagrammatic view illustrating an installation embodying our present invention, in connection with a main automotive vehicle, or tractor, provided with an internal combustion engine, and brake mechanism, and a trailing vehicle propelled by the tractor and provided with independent mechanism, separate power actuators being provided for the brake mechanism of said vehicles and controlled by a single valve mechanism on the tractor.

Fig. 2 is an enlarged sectional view of the controlling valve mechanism illustrated in Fig. 1, showing the higher pressure valves in closed position and the lower pressure or suction valve in open position.

Fig. 3 is a view similar to Fig. 2, showing the lower pressure or suction valve closed, and the higher pressure valves in partially opened position.

Fig. 4 is a vertical section on the line 4—4 of Fig. 3.

Fig. 5 represents a similar section, on the line 5—5 of Fig. 3.

Fig. 6 is a detail view showing the valve mechanism for the actuator, attached to the operator operated part of another brake mechanism not controlled by the valve, as the emergency brake mechanism.

Fig. 7 is a partial sectional view of a valve mechanism embodying our invention in which the higher pressure valve seat member is of the diaphragm type.

Figure 8:
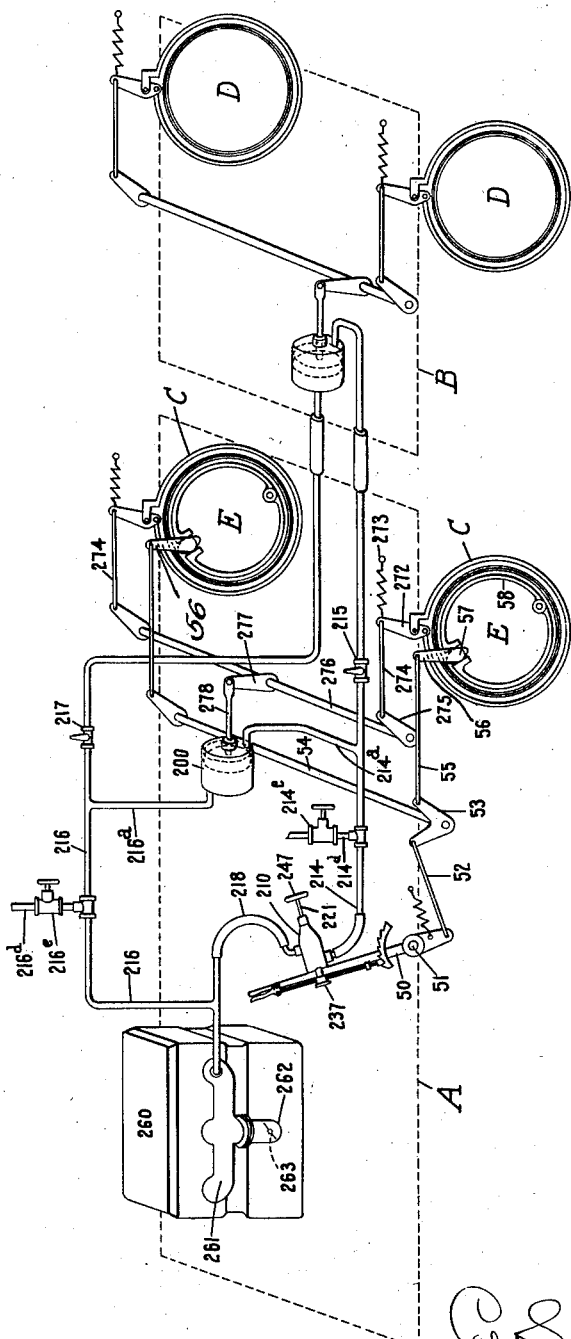
Fig. 8 is a diagrammatic view similar to Fig. 1 showing the arrangement of the parts when the valve is mounted as in Fig. 6.

Referring to the diagram, Fig. 1, we have shown therein a main automotive vehicle, or tractor, indicated by dotted lines, at A, and a trailing vehicle, indicated by dotted lines at B, propelled by the tractor and connected therewith by any suitable coupling (not shown). Each of the vehicles is provided with brake mechanism which may be of any desired character and may be applied to as many of the wheels of the vehicle as desired. For purposes of illustration, we have indicated, diagrammatically, in Fig. 1, a pair of brake mechanisms, C, C, for two opposite wheels of the main vehicle, or tractor, each comprising in this instance a brake drum, 70, brake band, 71, brake lever, 72, retracting spring, 73, the brake levers being connected by links, 74, with arms, 75, on a rock shaft, 76, provided with an operating arm, 77, for enabling the brake mechanisms, C, C, to be applied simultaneously by means of a power actuator, comprising a cylinder, indicated at 1, in this instance closed at both ends by heads, 2, 2, and having a piston rod, 4, connected with the arm, 77, by link, 78. The trailer is shown provided with similar brake mechanisms, indicated diagrammatically at D, D, constructed and arranged exactly as hereinbefore described, and operatively connected with the piston of an actuator carried on the trailer, the corresponding parts being indicated by the same numerals as those above described, with the addition of 100. The tractor is shown provided with an internal combustion engine, indicated at 60, having an intake manifold, 61, carburetor, 62, and throttle valve, 63, which may be of any usual or desired construction, the intake manifold and the vertical passage connecting it with the carburetor, constituting the suction passage of the engine.

The controlling valve mechanism illustrated herein is preferably located on the dash or instrument board of the tractor and provided with an operator operated part, adapted to be operated by hand. The valve mechanism comprises in this instance a valve casing, indicated at 10, which is preferably formed in two parts, united by screws, one of which is shown at 10a. The interior of the valve casing is provided with a centrally located valve chamber, 11, and at its opposite ends with the inlet chamber, 12, and outlet chamber, 13, adapted to be connected respectively with the sources of higher and lower fluid pressures. The valve chamber, 11, is connected by means of a pipe, 14, with the actuator cylinders, 1 and 101, in rear of the pistons therein, the pipe, 14, having a branch, 14ª, connected with the cylinder, 1, in rear of its piston, and being extended to the rear end of the tractor, where it is connected by flexible pipe section, 14b, with a pipe section, 14c, leading to the cylinder, 101, in rear of the piston. The pipe, 14, may be conveniently provided with a shut-off cock, 15, in rear of the branch 14ª, for cutting off the rear section of the pipe, 14, when the trailer is not used with the tractor. We prefer to connect the cylinder of each actuator with the source of lower pressure, which is in this instance the suction passage of the internal combustion engine, and we have shown a suction pipe, 16 extending from the intake manifold, 61, of the internal combustion engine, 60, to the rear end of the tractor, and having a branch, 16ª, connected with the cylinder, 1, forward of the piston therein, the rear end of the suction pipe, 16, being connected by a flexible section 16b, with a pipe section, 16c, connected with the cylinder, 101, forward of the piston. We have also shown the section, 16, provided with a shut-off valve, 17, in rear of the branch, 16ª, to be closed in case the trailer is disconnected. The lower pressures chamber, 13, of the valve casing is also connected to the source of lower pressure, in this instance by a pipe, 18, which may be connected, as shown, to the suction pipe, 16. Between the lower pressure chamber, 13, and the valve chamber, 11, of the valve casing, we provide a valve seat, 19, for the lower pressure valve, or suction valve, 20, which is supported by a valve actuating part, 21, extending through one end of the valve casing, and being provided with a stuffing box or sealing collar, 22, of any usual or desired form. The valve, 20, is conveniently formed of molded rubber, cork composition, or other suitable material, and is provided with a central aperture engaging the valve actuating part, 21, with a sealing fit, while permitting the movement of the valve actuating part through the valve. The valve, 20, is shown provided at its rear face with a metal plate, 23, and is engaged by a light spring, 24, in a direction tending to seat the valve. The valve operating part is provided with a collar, 25, secured in position by a spring ring, 26, or otherwise, for engaging the outer face of the valve and moving it in a direction to open it against the spring, 24. The valve chamber, 11, is provided with a higher pressure fluid valve mechanism comprising a valve seat member having its outer edges in sealing engagement with the valve casing, and provided with one or more, and preferably a plurality of inlet apertures surrounded by valve seats to engage inlet valves movable with respect to the valve seat member and casing, and having a limited movement with respect to the casing. In Figs. 2, 3 and 4 the valve seat member is shown as a piston, 30, provided with gasket, 31, engaging a cylindrical portion of the valve chamber, the said valve seat member being in this instance provided with a projecting hub portion, indicated at 32, engaging a recess, 33, in a transverse partition, 34, interposed between the valve chamber, 11, and the higher pressure chamber, 12. In this instance the partition, 34, is made integral with one part of the valve casing, for convenience, and the valve casing is threaded exteriorly and provided with an end section, 35, screwed thereon, and provided with a central aperture, 36, to which the higher pressure fluid source is connected. In this instance, in which the lower pressure fluid source is suction, the aperture, 36, is shown connected with the atmosphere, an air strainer, 37, being screwed into the aperture, 36. It will be obvious, however, that the higher pressure fluid inlet aperture, 36, could be connected with a source of higher pressure than atmospheric, if desired, in which case the lower pressure chamber, 13, could be connected either with the atmosphere, or with a source of suction, as preferred, and the operation of the valve mechanism and the actuators would be the same in either case.

The exterior of the hub, 32, and the interior of the recess, 33, in the partition, 34, are so constructed as to prevent the rotation of the valve with respect to the casing. This is conveniently effected by providing the one with a key, 38, to engage a groove in the other, as indicated in Fig. 5. The valve seat member, 30, is provided with a central recess extending into the hub, 32, to receive the end of the valve actuating part, 21, and means are provided for enabling the seat member, 30, to be moved in a direction to open communication between the valve chamber and the higher pressure source after the suction valve or lower pressure valve has been permitted to close. To this end the valve actuating part, 21, is provided with a reduced end portion, indicated at 21ª, adapted to pass through the central aperture in a metal disc, 39, and the inner end of the valve actuating part, 21, is provided with a collar, 21ᵇ, secured thereto by a pin, 21ᶜ, for example, so that the plate, 39, occupies the position between the collar, 21ᵇ, and a shoulder, 21ᵈ, where the reduced portion and main portions of the valve actuating part meet.

For convenience of assembly, the valve actuating part is passed through the aperture in the outer member of the valve casing, the suction valve, 20, is placed in position thereon, together with a collar, indicated at 40, the spring, 24, and the plate, 39. The collar, 21ᵇ, is then placed on the end of the valve actuating part, 21, and secured in position, and inserted in the hub recess of the higher pressure valve seat member. The plate, 39, is then secured in position with respect to the valve, by means of screws, and as shown, is also employed for holding the gasket, 31, in position. The valve seat member, 30, when in its retracted position, will be arrested by the engagement of the hub portion, 32, with the inner end of the recess, 33, in the partition, 34, and may also be arrested by the engagement of the valve seat member with the walls of the recess, 33, either (or both) of which forms a stop for the seat member. The valve seat member, 30, is held seated by suitable yielding resistance means, in this instance a plurality of springs, 41, interposed between the inner face of the piston or seat member and suitable recesses formed in the valve casing, these springs pressing the seat member against its stop or arresting means before described, and being of sufficient strength to offer material resistance to the movement of the seat member by the valve actuating device in the opposite direction, when the fluid pressures on opposite faces of the piston or seat member, which are of substantially equal area, are equalized. The opposite faces of the piston or seat member, 30, are of very considerable area, and of an area much larger than that of the higher pressure inlet passages or passages formed therein.

One of the objects of our invention is to provide for a gradual admission of the higher pressure fluid when the higher pressure valve seat member, 30, is moved in a direction to open the inlet apertures or passages with which it is provided, that is, to the right in Figs. 1, 2 and 3. For this purpose, the valve seat member, 30, is provided preferably with a plurality of through passages, indicated at 42, of any desired number, and conveniently arranged in a circular series around the axis of the valve, each of said apertures being controlled by a valve, indicated at 43, normally held seated by a spring, 44, interposed between the valve, 43, and the partition, 34, each valve having a stem, 45, extending through a guiding aperture in the partition, and provided with an enlarged head, 46, adapted to be brought into engagement with the partition when the seat member is moved in a direction away from the partition. Each of the valve stem heads, 46, is located a different distance from the outer face of the partition, 34, so that as the valve seat member, 30, is moved in a direction to open communication between the higher pressure source and the valve chamber, one of these valves, 43, will be opened first, uncovering one of the small through passages, 42, the further opening movement of the valve seat member, 30, effecting the opening of another of said valves, 43, and so on, thus gradually admitting the higher pressure fluid to the valve chamber, and through the pipe, 14, to the actuator cylinder or cylinders in rear of the pistons therein, as hereinafter described. The partition, 34, is provided with a plurality of apertures, indicated at 34ª, for establishing communication between the valve chamber and the higher pressure chamber, 12, under the control of the said individual inlet valves, 43.

The valve actuating part, 21, is provided with an operator operated part, as the handle, 47, secured thereto within convenient reach of the operator, and we prefer to provide means for preventing the rotation of the handle or operator operated part with respect to the valve casing, so that the operator can readily seize it to apply the brakes. To this end the valve actuating part, 21, is conveniently provided with a key, indicated at 48, engaging a groove, 49, in a bushing, surrounding the valve actuating part, and secured to the casing, to prevent the rotation of the valve actuating part, 21, and the handle, 47, with respect to the valve casing.

It will be seen that the apertures, 34ª, in the partition, 34, which establish communication between the higher pressure chamber, 12, and the portion of the valve chamber exterior to the higher pressure valve seat member, 30, to expose the outer face of the seat member, 30, to the pressure of the higher pressure fluid at all times. The seat member, 30, is of considerably greater area than the suction or lower pressure valve, and the pressure of the higher pressure fluid, in this instance the atmosphere, upon the outer face of the seat member, will be nearly equal to the pressure of the yielding resistance springs, 41, in the opposite direction, and will nearly counterbalance the same when the inner face of the seat member, 30, is exposed to the lower pressure, in this instance suction. It will be noted that the connection between the plate, 39, forming part of and connected with the seat member, 30, and the valve actuating part provides lost motion between them so that the suction or lower pressure valve, 20, may be closed simultaneously with the higher pressure valve or valves, the suction or lower pressure valve being forced into open position by an inward pressure on the handle, 47, and the valve actuating part against the pressure of the light spring, 24. This establishes communication between the suction pipe, 18, and the actuator cylinders, in rear of their pistons, and as the actuator cylinders forward of their pistons are connected with the intake manifold by the suction pipe, 16, when the valve is in the position indicated in Fig. 2, and the engine is running, the air will be exhausted from the cylinders on both sides of the pistons, submerging them in vacuum, and the interior of the valve chamber, 11, will also be exhausted, so that the atmospheric pressure on the exterior face of the higher pressure valve, 30, will nearly counterbalance the pressure of the resistance springs, 41, in the opposite direction. This is the normal position of the valve mechanism.

The suction valve is of very small diameter as compared with the piston or seat member, 30, and is preferably made no larger than necessary, or in other words very little larger than the passages which it controls, so that the differential of fluid pressures to which its opposite faces are exposed will be so slight as to offer no appreciable resistance to the movements of the valve actuating part. The valve actuating part when pushed inward, as described, to effect the opening of the small suction or lower pressure valve is normally held in this position (illustrated in Fig. 2) by the differential of pressures, produced by the atmospheric pressure on the area of the valve actuating part, 21, and the rarification which exists in the valve chamber when the suction valve is opened, and the valve actuating part, 21, is made of sufficient diameter to provide this differential of pressures, when the suction valve is open. When the valve actuating part is drawn out and the suction valve is permitted to close and pressure is built up within the valve casing and the portion of the cylinder with which it is connected, as hereinafter described, by the opening of one or more of the inlet valves, 43, the differential of fluid pressures on the operator operated part decreases to minimum, and the suction valve is exposed to the accumulated pressure on its inner face in addition to the pressure of its spring, 24, and to suction on its outer face, so that the suction valve will remain closed, and the valve actuating part will tend to remain in the position in which it is left by the operator.

To apply the brake mechanism, the operator will seize the handle, 47, and draw out the valve actuating part, 21. The first portion of the movement permits the lower pressure or suction valve, 20, to close, cutting off the communication between the rear portion of each cylinder and the source of lower pressure in this instance suction, while leaving the forward ends of the cylinders connected to the source of lower pressure. This movement of the rod 21, will also take up the lost motion between the valve actuating part and the higher pressure valve seat member 30, that is to say between the ring or collar 21$^b$ and the plate 39. As the operator continues to draw out the rod, 21, the piston or valve seat member, 30, will now be moved outward in the direction of the arrow indicated in Fig. 2. The resistance springs, 41, will offer very little resistance to the movement of the seat member, 30, up to this point, as their pressure is very nearly counterbalanced by the atmospheric pressure on the outer face of the seat member, 30, which is fully exerted as the interior of the valve casing is in a rarified condition. As the seat member, 30, continues to be drawn in the direction of the arrow, the head of the shortest of the valve stems, 45, will be brought into contact with the partition, 34, as indicated in Fig. 3, arresting the movement of the valve stem, so that the continued movement of the seat member, 30, will open this one valve, as shown in Fig. 3, permitting the higher pressure fluid to pass through the minute opening, 42, controlled by the valve 43, to the valve chamber, 11, and to the actuator cylinders in rear of their pistons through the pipe connections, 14, 14$^a$, etc. Pressure will be built up gradually within the valve chamber, 11, and the cylinders in rear of their pistons, and as the pressure on the inner face of the seat member, 30, increases, the pressure of the resistance springs, 41, will be transferred to the operator operated part and to the hand of the operator in proportion to the decrease in the differential of fluid pressures on opposite faces of the seat member or piston, 30, so that the operator is enabled, by his sense of feeling, to know the extent to which pressures are built up in the actuator cylinders, and the corresponding pressures applied to the brake mechanisms. A further movement of the seat member, 30, in the direction of the arrow, will open another, or others, of the air inlet valves, 43, which preferably are opened in an orderly sequence, so that the rapidity with which the air or higher pressure fluid is admitted to the cylinders in rear of their pistons to apply the brake mechanism, can be very readily and accurately controlled, while in case of emergency, a sudden pull of the valve actuating part, 21, to its fullest extent would open all the valves, 43, to secure an almost instantaneous application of the brakes.

When the seat member or piston, 30, has been pulled out by the outward movement of the handle 47 and member 21 far enough to open one or more of the small air inlet valves, 43, and apply the brakes to the desired extent, if the operator releases the handle, 47, the resistance springs, 41, will return the seat member, 30, to its normal position, in which it is arrested by its stopping means, and thereby closing the inlet valves, 43, which have been opened. This will be accomplished without opening the lower pressure or suction valve, 20, which will remain seated under the action of its light seating spring, 24, and also the pressure of the higher pressure fluid which is now within the valve chamber, 11. As soon as the seat member, 30, encounters its stop, the pressure of the resistance means is immediately transferred from the operator to the valve casing, so that the pistons of the actuators may be maintained in the positions to which they have been moved and the brakes may be maintained as applied without the necessity of the operator holding out the valve actuating part, 21, or sustaining any resistance whatever from the springs, 41. In fact, he may remove his hand from the handle, 47, altogether, and leave the brakes applied, being free to use his hand for other purposes. To release the brake mechanism, the operator will press in the valve actuating part, 21, by means of the handle, 47, in the direction opposite that indicated by the arrow in Figs. 2 and 3, thereby bringing the collar, 25, into engagement with the suction or lower pressure valve and opening the valve, when the higher pressure fluid in the cylinders in rear of the pistons will instantly relieve itself through the space between the lower pressure valve and its seat, being in this instance withdrawn through the suction pipe, 18, to the intake manifold and immediately relieving the actuator pistons, so that the brakes may release themselves under the action of their draft and their retracting means, and as the pressures on opposite sides of the actuator pistons are equalized by the exhausting of the higher pressure fluid, the pistons and brake mechanism will be returned to normal position under the action of the retracting means for the brakes, and the pistons are again submerged in vacuum. The valve mechanism will remain in the off position indicated in Fig. 2 without being held by the operator, as the pressure of air against the exterior face of the valve actuating part, 21, while the interior of the valve casing is submerged in vacuum, is sufficient, as previously described, especially in connection with the frictional resistance to the movement of said part, 21, by the stuffing box, or sealing device, to prevent the light spring, 24, from closing the lower pressure or suction valve.

It is perfectly obvious that if, as before stated, the higher pressure inlet, 36, of the valve casing were connected to a supply of compressed air or other pressure fluid higher than atmosphere, and the lower pressure chamber, 13, were connected either to suction by pipe, 18, or to the atmosphere, the operation of the valve would be exactly the same, but obviously the springs, 41, would be calibrated so as to slightly more than counterbalance the pressure of the higher fluid pressure employed on the opposite face of the valve seat member, 30, or the size of the valve seat member, 30, may be changed to give the desired resistance.

It will be seen that this valve mechanism can be very readily applied to the dash where it is not directly connected with either of the brake mechanisms controlled by it, or the actuator pistons thereof, and that it can be employed to operate one or more actuator cylinders, the pistons of which are preferably maintained in vacuum when retracted, as previously described, and by providing the several inlet apertures for higher pressure fluid, which are opened in sequence, a very accurate regulation of the speed of movement of the piston or pistons to apply the brake mechanism and of the amount of pressure exerted on the brakes by the piston or pistons is obtained. The speed of the application of the brakes is determined by the rapidity of outward movement of the handle, the amount of pressure being exerted on the brakes by the piston is determined by the increasing resistance upon the handle it is moved outwardly, so that the operator is apprised at all times when he is operating the brakes as to the braking pressure exerted by them.

In some instances the valve mechanism herein described may be applied to a movable part such for instance as the emergency brake lever. We have indicated such an arrangement generally in Fig. 6 and diagrammatically in Fig. 8 and all of the parts have been indicated by the same reference characters as heretofore employed with the addition of 200. The emergency brake lever has been indicated at 50 pivoted upon the chassis of the vehicle at 51 and connected through a link 52 to lever 53 on the cross shaft 54. This latter shaft is connected by rods 55 to levers 56 which are pivoted as is customary upon the brake drums here indicated as the drums of the brake mechanism C and the inner end of each lever 56 carries a cam 57 operating to expand the brake shoes 58 of the brake mechanism generally indicated by the reference character E. In this arrangement we therefore have two brake mechanisms on the main vehicle or tractor, one embodying a contracted brake band operated by the power actuator 200, and the other embodying internally expanding brake shoes operated by the emergency brake lever 50.

In the operation of the mechanism illustrated in Fig. 8, when the operator pulls upon the operator operated part or handle 247 of the valve mechanism, the valve actuating part 221 will be moved outwardly with the result that the suction valve will be closed and the inlet or high pressure valves opened in succession as heretofore described. This operation will cause the actuation of the brake mechanism connected to the brake actuator to a greater or less extent and without operating the emergency brake lever. When, however, the high pressure valves have been fully opened, a further movement of the handle 247 toward the operator will cause an actuation of the brake lever 50 and a consequent rotation of the cams 57 to apply the brake shoes 58. Thus it will be seen that after actuating the power brakes C to the fullest extent under control of the valve mechanism, the operator may add his physical force to the braking action by a movement of the emergency lever. It will also be seen that after such operation and a stoppage of the vehicle, the valve parts may be returned to normal position and the power brakes released without releasing the emergency brakes which will hold the vehicle in stopped position. By operating the emergency lever in the usual fashion of such levers the emergency brake may be, of course, applied independently of any movement of the power actuator.

The valve actuating part, 21, is also preferably provided with a stop, here shown as a collar, 40, attached to the valve actuating part and adapted to engage a part connected with the valve casing, as the metal plate or ring, 22ª, in rear of the stuffing box or sealing means, 22, which stop serves to limit the extent to which the valve actuating part, 21, can be drawn out, to prevent damage to the valves and permit the physical force of the operator to be transferred to the valve casing and to the brake lever, 50.

While we have shown the valve actuating part operated by a handle, which is our preferred construction, where the valve casing is mounted on the dash or instrument board, we do not limit ourselves to this arrangement as it is obvious that many modifications might be resorted to without in any way departing from the scope of the invention.

It will be entirely obvious that by proper pipe connection, a single valve mechanism, such as herein described, may be employed to control one, two or more power actuators, to produce a practically simultaneous operation of the same. In Fig. 1, we have shown a single valve mechanism controlling two actuators, the cylinders of which are indicated at 1 and 101, and the pipes, 14 and 16, are shown provided with additional branches, 14ᵈ and 16ᵈ, having cut off valves, 14ᵉ and 16ᵉ, respectively, which may be connected to other actuator cylinder or cylinders.

In some instances the portion of the higher pressure valve mechanism which is exposed to differential pressures may be in the form of a flexible diaphragm instead of a piston, as indicated in Fig. 7, in which the parts corresponding with those in Figs. 2 and 3 are given the same reference numerals with the addition of 100. As shown in the drawing, the higher pressure valve seat member, 130, is in the form of an annular diaphragm, the outer edges of which are clamped between parts of the valve casing, the inner edges being secured to the hub, 132. The diaphragm, 130, is acted upon by the resistance springs, 141, which preferably engage a metal plate, 139, connected with the hub, 132, and leaving a space around its outer edge so that the inner face of the diaphragm can be acted upon by the fluid pressure within the valve chamber. The diaphragm is provided with the small air inlet apertures, 142, which are normally closed by the small valves, 143, having their stems respectively of different lengths to effect a sequential opening of the apertures, 142, when the diaphragm is drawn outwardly, (to the right in Fig. 7). The operation of the valve mechanism shown in Fig. 7 is the same as that previously described and need not be repeated.

It is obvious that our invention will operate successfully with a valve seat member having a single higher pressure inlet passage and a single inlet valve (43 or 143), controlling the same, but we prefer to provide a plurality of inlet passages and valves, and means for effecting the successive opening of the valves, in order to secure the graduated inlet of the higher pressure fluid and a graduated application of the brakes as hereinbefore described.

What we claim and desire to secure by Letters Patent is:—

1. Valve mechanism for controlling the operation of power actuators comprising among its members a valve casing, provided with means for connecting it with a source of higher fluid pressure, a valve seat member having portions movable with respect to the valve casing, and portions in sealing engagement therewith, and provided with a plurality of passages of reduced diameter extending through it for establishing communication between the source of higher pressure and a portion of each power actuator controlled thereby and for equalizing fluid pressures on opposite faces of said seat member when in open position, said seat member having opposite faces of much greater area than said passages and substantially equal, one face being at all times subjected to the higher fluid pressure in a direction tending to move said seat member into open position and the other face being subjected to the highest pressure within said power actuator, yielding resistance means normally holding said seat member in closed position against the higher fluid pressure thereon, and offering material resistance to its movement in a direction away from closed position when the fluid pressures on opposite faces of the seat member are equalized, an operator operated part connected with said seat member, and means for normally closing said passages in said seat member, constructed to effect the opening of said passages successively by the movement of said seat member away from its closed position, whereby when said seat member is moved away from its closed position said passages will be opened successively to secure a graduated operation of the power actuator, and the pressure of said resistance means will be transferred to the operator operated part in proportion to the decrease of the differential of fluid pressures on opposite faces of the seat member and within the power actuator.

2. Valve mechanism for controlling the operation of power actuators comprising among its members a valve casing, provided with means for connecting it with a source of higher fluid pressure, a valve seat member having portions movable with respect to the valve casing, and portions in sealing engagement therewith, and provided with a plurality of passages of reduced diameter extending through it for establishing communication between the source of higher pressure and a portion of each power actuator controlled thereby and for equalizing fluid pressures on opposite faces of said seat member when in open position, said seat member having opposite faces of much greater area than said passages and substantially equal, one face being at all times subjected to the higher fluid pressure in a direction tending to move said seat member into open position and the other face being subjected to the highest pressure within said power actuator, yielding resistance means normally holding said seat member in closed position against the higher fluid pressure thereon, and offering material resistance to its movement in a direction away from closed position when the fluid pressures on opposite faces of the seat member are equalized, an operator operated part connected with said seat member, a series of separate inlet valves normally closing the passages in said seat member, and movable therewith, and means for arresting said inlet valves at different points in the opening movement of the valve seat to successively open said passages, whereby when said seat member is moved away from its closed position said passages will be opened successively to secure a graduated operation of the power actuator, and the pressure of said resistance means will be transferred to the operator operated part in proportion to the decrease of the differential of fluid pressures on opposite faces of the seat member and within the power actuator.

3. Valve mechanism for controlling the operation of power actuators comprising among its members a valve casing, provided with means for connecting it with a source of higher fluid pressure, a valve seat member having portions movable with respect to the valve casing, and portions in sealing engagement therewith, and provided with a plurality of passages of reduced diameter extending through it for establishing communication between the source of higher pressure and a portion of each power actuator controlled thereby and for equalizing fluid pressures on opposite faces of said seat member when in open position, said seat member having opposite faces of much greater area than said passages and substantially equal, one face being at all times subjected to the higher fluid pressure in a direction tending to move said seat member into open position and the other face being subjected to the highest pressure within said power actuator, yielding resistance means normally holding said seat member in closed position against the higher fluid pressure thereon, and offering material resistance to its movement in a direction away from closed position when the fluid pressures on opposite faces of the seat member are equalized, an operator operated part connected with said seat member, a series of separate auxiliary inlet valves normally closing said passages in the valve seat and movable with and with respect to the valve seat, yielding means for seating said auxiliary valves, said auxiliary valves being provided with valve stems having stops thereon, and arresting means for engaging said stops when the valve seat is moved away from closed position, to open said inlet valves, the stops on the respective valve stems and the arresting means therefor being constructed to effect the opening of the inlet valves successively, whereby when said valve seat member is moved away from its closed position said passages will be opened successively to secure a graduated operation of the power actuator, and the pressure of said resistance means will be transferred to the operator operated part in proportion to the decrease of the differential of fluid pressures on opposite faces of the seat member and within the power actuator.

4. Valve mechanism for controlling the operation of power actuators comprising among its members a valve casing, provided with means for connecting it with a source of higher fluid pressure, a piston valve seat member movable in the valve casing, and having portions in sealing engagement therewith, and provided with a plurality of passages of reduced diameter extending through it for establishing communication between the source of higher pressure and a portion of each power actuator controlled thereby, and for equalizing fluid pressures on opposite faces of said seat member when in open position, said piston seat member having opposite faces of much greater area than said passages and substantially equal, one face being at all times subjected to the higher fluid pressure in a direction tending to move said piston into open position and the other face being subjected to the highest pressure within said power actuator, yielding resistance means normally holding said piston in closed position against the higher fluid pressure thereon, and being nearly counterbalanced by said higher fluid pressure when the differential of fluid pressures on said piston is at the maximum, and offering material resistance to the movement of said piston in a direction away from closed position when the fluid pressures on opposite faces of the piston are equalized, an operator operated part connected with said piston seat member, auxiliary inlet valves movable with and with respect to said piston for normally closing said passages when the piston is in closed position, yielding means for seating said auxiliary inlet valve, independent means for limiting the movement of the respective inlet valves with the piston to effect the successive opening of said inlet valves as the piston seat member is moved away from its closed position, whereby when said piston seat member is moved away from its closed position said passages will be opened successively to secure a graduated operation of the power actuator or actuators, and the pressure of said resistance means will be transferred to the operator operated part in proportion to the decrease of the differential of fluid pressures on opposite faces of the piston seat member and within the power actuator.

5. In brake mechanism for an automotive vehicle, including a power actuator operating by differentials of fluid pressure, and comprising a cylinder and a piston therein operatively connected with brake mechanism of the vehicle, the combination with controlling valve mechanism for the actuator comprising among its members a valve casing, a valve seat member having portions movable with respect to the valve casing and portions in sealing engagement therewith, and provided with a plurality of passages of reduced diameter extending through it for establishing communication between the source of higher pressure and a portion of the actuator cylinder, and for equalizing fluid pressures on opposite faces of said seat member when in open position, said seat member having opposite faces of much greater area than said passages and substantially equal, one face being at all times subjected to the higher fluid pressure in a direction tending to move said seat member into open position and the other face being subjected to the highest pressure within said power actuator cylinder, yielding resistance means normally holding said seat member in closed position against the higher fluid pressure thereon and being nearly counterbalanced by said higher fluid pressure when said seat member is exposed to the maximum differential of fluid pressures thereon, and offering material resistance to the movement of said seat member in a direction away from closed position when the fluid pressures on opposite faces of the seat member are equalized, independent inlet valves normally closing said passages in said seat member, and means for opening said valves successively by the movement of said seat member away from its closed position, and an operator operated part connected with said seat member, whereby when said seat member is moved away from its closed position by the operator operated part said passages will be opened successively to secure a graduated operation of the power actuator and brake mechanism, and the pressure of said resistance means will be transferred to the operator operated part in proportion to the decrease of the differential of fluid pressures on opposite faces of the seat member and within the power actuator.

6. In brake mechanism for an automotive vehicle, including a power actuator comprising a cylinder and a piston therein operatively connected with brake mechanism for the vehicle, the combination with controlling valve mechanism comprising among its members a valve casing provided with means for connecting it to said cylinder, and independent means for connecting it with the sources of higher and lower fluid pressures, a lower pressure valve interposed between the said cylinder connection and said lower pressure connection, said valve having its diameter only slightly in excess of that of the passages which it controls, and being subjected when closed to the maximum differential of fluid pressures on its opposite faces tending to hold it closed, light yielding means acting on said valve in a direction to close it when opened, a higher pressure valve seat member interposed between said cylinder connection and the higher pressure connection, having portions movable with respect to the valve casing and portions in sealing engagement therewith, and provided with a plurality of passages of reduced diameter extending through it, said seat member having opposite faces of much greater area than said passages and substantially equal, one face being at all times subjected to the higher fluid pressure in a direction tending to move said seat member into open position and the other face being subjected to the highest pressure within the valve casing and the portion of the actuator cylinder connected therewith, yielding resistance means normally holding said seat member in closed position against the higher fluid pressure thereon, and being nearly counterbalanced by said higher fluid pressure when the differential of fluid pressures on said seat member is at maximum, and offering material resistance to the movement of said seat member in a direction away from closed position when the fluid pressures on opposite faces of the seat member are equalized, an operator operated part connected with said seat member and said lower pressure valve by means constructed to effect the opening of one after permitting the closing of the other when the operator operated part is moved in either direction, and to permit both to be simultaneously closed, means for normally closing said passages in said seat member, means for effecting the successive opening of said passages by the movement of said seat member awal from its closed position, and a stop for arresting the seat member when in closed position, whereby a movement of the operator operated part in one direction will permit the lower pressure valvet to close and move the higher pressure valve seat away from its stop to open said passages successively to secure a graduated application of the brake mechanism by the power actuator, and the pressure of said resistance means will be transferred to the operator operated part in proportion to the decrease of the differential of fluid pressures on opposite faces of the seat member and within the power actuator, and the release of the operator operated part will permit the resistance means to return the said seat member to closed position without opening the lower pressure valve and transfer the pressure of said resistance means to said stop, while holding the brakes as applied, and a further return movement of the operator operated part will effect the opening of the lower pressure valve and the release of the brake mechanism.

7. In brake mechanism for an automotive vehicle, including a power actuator comprising a cylinder and a piston therein operatively connected with brake mechanism for the vehicle, the combination with controlling valve mechanism comprising among its members a valve casing provided with means for connecting it to said cylinder, and independent means connecting it with the sources of higher and lower fluid pressures, a lower pressure valve interposed between the said cylinder connection and said lower pressure connection, said valve having its diameter only slightly in excess of that of the passages which it controls, and being subjected when closed to the maximum differential of fluid pressures on its opposite faces tending to hold it closed, light yielding means acting on said valve in a direction to close it when opened, a higher pressure valve seat member interposed between said cylinder connection and the higher pressure connection, having portions movable with respect to the valve casing and portions in sealing engagement therewith and provided with a plurality of passages of reduced diameter extending through it, said seat member having opposite faces of much greater area than said passage and substantially equal, one face being at all times subjected to the higher fluid pressure in a direction tending to move said seat member into open position and the other face being subjected to the highest pressure within the valve casing and the portion of the actuator cylinder connected therewith, yielding resistance means normally holding said seat member in closed position against the higher fluid pressure thereon, and being nearly counterbalanced by said higher fluid pressure when the differential of fluid pressures on said seat member is at maximum, and offering material resistance to the movement of said seat member in a direction away from closed position when the fluid pressures on opposite faces of the seat member are equalized, an operator operated part connected with said seat member and said lower pressure valve by means constructed to effect the opening of one after permitting the closing of the other when the operator operated part is moved in either direction, and to permit both to be simultaneously closed, means for normally closing said passages in said seat member, means for effecting the successive opening of said passages by the movement of said seat member away from its closed position, and a stop for arresting the seat member when in closed position, the operator operated part having opposite faces exposed to fluid pressures the differential of which when the lower pressure valve is opened is exerted on the operator operated part in a direction to hold said valve open and with sufficient force to overcome the resistance spring for said valve, whereby a movement of the operator operated part in one direction will permit the lower pressure valve to close under the action of its spring and move said valve seat away from its stop to open said passages successively, and transfer the pressure of said resistance means to the operator operated part in proportion to the decrease of the differential of fluid pressures on opposite faces of the seat member and within the power actuator, and the release of the operator operated part will permit the resistance means to return said seat member to closed position without opening the lower pressure valve, and transfer the pressure of said resistance means to said stop while holding the brakes applied, and a further return movement of the operator operated part will effect the opening of the lower pressure valve and the release of the brake mechanism and hold the lower pressure valve in open position.

8. In brake mechanism for an automotive vehicle, including a power actuator comprising a cylinder and a piston therein operatively connected with brake mechanism for the vehicle, the combination with controlling valve mechanism for the actuator comprising a valve casing exterior to the cylinder and supported independently thereof, and provided with means for connecting it with the cylinder on one side of the piston, and means for connecting it with the sources of higher and lower fluid pressures, a lower pressure valve interposed between the said cylinder connection and said lower pressure connection, said valve having its diameter only slightly in excess of that of the passages which it controls, and being subjected when closed to the maximum differential of fluid pressures on its opposite faces tending to hold it closed, light yielding means acting on said valve in a direction to close it when opened, a higher pressure valve seat member interposed between said cylinder connection and the higher pressure connection, having portions movable with respect to the valve casing, and portions in sealing engagement therewith, and provided with a plurality of passages of reduced diameter extending through it, said seat member having opposite faces of much greater area than said passages and substantially equal, one face being at all times subjected to the higher fluid pressure in a direction tending to move said seat member into open position and the other face being subjected to the highest pressure within the valve casing and the portion of the actuator cylinder connected therewith, yielding resistance means normally holding said seat member in closed position against the higher fluid pressure thereon, and being nearly counterbalanced by said higher fluid pressure when the differential of fluid pressures on said seat member is at maximum, and offering material resistance to the movement of said seat member in a direction away from closed position when the fluid pressures on opposite faces of the seat member are equalized, an operator operated part provided with a hand engaging portion and connected with said seat member by means constructed to effect the movement of one to open position after permitting the closing of the other, when the operator operated part is moved in either direction, and to permit both to be simultaneously closed, inlet valves normally closing said passages in said seat member, means for effecting the successive opening of said passages by the movement of said seat member away from its closed position, and a stop for arresting the seat member when in closed position, whereby a movement of the operator operated part in one direction will permit the lower pressure valve to close and move the valve seat away from its stop to open the passages therein successively to secure a graduated application of the brake mechanism by the power actuator, and to transfer the pressure of said resistance means to the operator operated part in proportion to the decrease of the differential of fluid pressures on opposite faces of the seat member and within the power actuator, and the release of of the operator operated part will permit the resistance means to return said seat member to closed position without opening the lower pressure valve and transfer the pressure of said resistance means to said stop while holding the brakes as applied, and a further return movement of the operator operated part will effect the opening of the lower pressure valve to release the brake mechanism.

9. In brake mechanism for an automotive vehicle provided with an internal combustion engine having a throttle controlled suction passage, a power actuator comprising a cylinder closed at both ends, and a piston therein operatively connected with brake mechanism of the vehicle, the combination with controlling valve mechanism for the actuator, means for connecting the cylinder on one side of the piston with the suction passage of the engine, and means for connecting the cylinder on the other side of the piston with the suction passage and with the atmosphere under the control of said valve mechanism, said valve mechanism comprising among its members a valve casing, a valve seat member interposed between the actuator cylinder and the atmosphere, and having portions movable with respect to the valve casing, and portions in sealing engagement therewith, and provided with a plurality of passages of reduced diameter extending through it, said seat member having opposite faces of much greater area than said passages and substantially equal, one face being at all times subjected to atmospheric pressure in a direction tending to move said seat member in open position and the other face being subjected to the highest pressure within the portion of the actuator cylinder connected with the valve casing, yielding resistance means normally holding said seat member in closed position against the atmospheric pressure thereon, and being nearly counterbalanced by said atmospheric pressure when the differential of fluid pressure on said seat members is at maximum, and offering material resistance to the movement of said seat member in a direction away from closed position when the fluid pressures on opposite faces of the seat member are equalized, an operator operated part connected with said seat member, means for normally closing the passages in said seat member, and means for effecting the successive opening of said passages by the movement of said seat member away from its closed position, whereby when said seat member is moved away from its closed position said passages will be successively opened to effect a graduated application of the brake mechanism, and the pressure of said resistance means will be transferred to the operator operated part in proportion to the decrease of the differential of fluid pressures on opposite faces of the seat member.

10. In brake mechanism for an automotive vehicle provided with an internal combustion engine having a throttle controlled suction passage, a power actuator comprising a cylinder closed at both ends, and a piston therein operatively connected with brake mechanism of the vehicle, the combination with controlling valve mechanism for the actuator, means for connecting the cylinder on one side of the piston with the suction passage of the engine, and means for connecting the cylinder on the other side of the piston with the suction passage and with the atmosphere under the control of said valve mechanism, said valve mechanism comprising a valve casing provided with means for connecting it to the cylinder, and independent means for connecting it with the suction passage and with the atmosphere, a suction valve interposed between the said cylinder connection and said suction connection, yielding means acting on said valve in a direction to close it, a valve seat member interposed between said cylinder connection and the atmospheric connection, having portions movable with respect to the valve casing and portions in sealing engagement therewith, and provided with a plurality of passages of reduced diameter extending through it, said seat member having opposite faces of much greater area than said passages and substantially equal, one face being at all times subjected to the atmospheric pressure in a direction tending to move said seat member into open position and the other face being subjected to the highest pressure within the valve casing and the portion of the actuator cylinder connected therewith, yielding resistance means normally holding said seat member in closed position against the atmospheric pressure thereon, and being nearly counterbalanced by said atmospheric pressure when the differential of fluid pressures on said seat member is at maximum, and offering material resistance to the movement of said seat member in a direction away from closed position when the fluid pressures on opposite faces of the seat member are equalized, an operator operated part connected with said seat member and said suction valve by means constructed to effect the movement of one into open position after permitting the closing of the other when the operator operated part is moved in either direction and to permit both to be simultaneously closed, air inlet valves normally closed said passages in said seat member, means for effecting the successive opening of said valves by the movement of said seat member away from its closed position, and a stop for arresting the seat member when in closed position, the operator operated part being constructed to normally hold the suction valve in open position, whereby a movement of the operator operated part in one direction will permit the lower pressure valve to close and move said valve seat away from its stop to open said inlet valve successively to secure a graduated application of the brake mechanism by the power actuator, and transfer the pressure of said resistance means to the operator operated part in proportion to the decrease of the differential of fluid pressures on opposite faces of the seat member and within the power actuator, and the release of the operator operated part will permit the resistance means to return said seat member to closed position without opening the suction valve, and transfer the pressure of said resistance means to said stop while holding the brakes as applied, and a further return movement of the operator operated part will effect the opening of the suction valve to release the brake mechanism.

11. In brake mechanism for an automotive vehicle provided with an internal combustion engine having a throttle controlled suction passage, a power actuator comprising a cylinder closed at both ends, and a piston therein operatively connected with brake mechanism of the vehicle, and means for connecting the cylinder on one side of the piston with the suction passage of the engine, the combination with controlling valve mechanism for the actuator comprising a valve casing connected with the cylinder on the other side of the piston, and provided with independent means for connecting it with the suction passage and with the atmosphere, a suction valve interposed between the said cylinder connection and suction connection of the valve casing, said valve having its diameter only slightly greater than that of the passages which it controls and being subjected when closed to the maximum differential of fluid pressures on its opposite faces tending to hold it closed, light yielding means acting on said valve in a direction to close it when opened, a valve seat member interposed between the cylinder connection and atmospheric connection of the valve casing, having portions movable with respect to the valve casing and portions in sealing engagement therewith and provided with a plurality of passages of reduced diameter extending through it, said seat member having opposite faces of much greater area than said passages and substantially equal, one face being at all times subjected to the atmospheric pressure in a direction tending to move said seat member into open position and the other face being subjected to the highest pressure within the valve casing and the portion of the actuator cylinder connected therewith, yielding resistance means normally holding said seat member in closed position against the atmospheric pressure thereon, and being nearly counterbalanced by said atmospheric pressure when the differential of fluid pressures on said seat member is at maximum, and offering material resistance to the movement of said seat member in a direction away from closed position when the fluid pressures on opposite faces of the seat member are equalized, an operator operated part connected with said seat member and said suction valve by means constructed to effect the opening of one after permitting the closing of the other when the operator operated part is moved in either direction and to permit both to be simultaneously closed, inlet valves normally closing said passages in said seat member, means for effecting the successive opening of said inlet valves by the movement of said seat member away from its closed position, a stop for arresting the seat member when in closed position, said operator operated part being provided with opposite faces, one of which is exposed at all times to atmospheric pressure and the other of which is exposed to suction when the suction valve is in open position, the differential of said pressures normally holding the suction valve open against the resistance of its yielding means, whereby a movement of the operator operated part in one direction will permit the suction valve to close and move the said valve seat away from its stop to open said inlet valves successively to secure a graduated application of the brake mechanism by the power actuator, and transfer the pressure of said resistance means to the operator operated part in proportion to the decrease of the differential of fluid pressures on opposite faces of the seat member and within the power actuator, and the release of the operator operated part will permit the resistance means to return said seat member to closed position and close said inlet valve without opening the suction valve and transfer the pressure of said resistance means to said stop while holding the brakes as applied, and a further return movement of the operator operated part will open the suction valve to release the brake mechanism and permit the suction valve to be held in open position.

12. In brake mechanism for an automotive vehicle provided with an internal combustion engine having a throttle controlled suction passage, a power actuator comprising a cylinder closed at both ends, and a piston therein operatively connected with brake mechanism of the vehicle, and means for connecting the cylinder on one side of the piston with the suction passage of the engine, the combination with controlling valve mechanism for the actuator comprising a valve casing exterior to the cylinder and supported independently of the piston and brake mechanism operated thereby, said casing being connected with the cylinder on the other side of the piston, and provided with independent means for connecting it with the suction passage and with the atmosphere, a suction valve interposed between the said cylinder connection and suction connection of the valve casing, said valve having its diameter only slightly greater than that of the passages which it controls and being subjected when closed to the maximum differential of fluid pressures on its opposite faces tending to hold it closed, light yielding means acting on said valve in a direction to close it when opened, a valve seat member interposed between the cylinder connection and atmospheric connection of the valve casing, having portions movable with respect to the valve casing and portions in sealing engagement therewith and provided with a plurality of passages of reduced diameter extending through it, said seat member having opposite faces of much greater area than said passages and substantially equal, one face being at all times subjected to the atmospheric pressure in a direction tending to move said seat member into open position and the other face being subjected to the highest pressure within the valve casing and the portion of the actuator cylinder connected therewith, yielding resistance means normally holding said seat member in closed position against the atmospheric pressure thereon, and being nearly counterbalanced by said atmospheric pressure when the differential of fluid pressures on said seat member is at maximum, and offering material resistance to the movement of said seat member in a direction away from closed position when the fluid pressures on opposite faces of the seat member are equalized, an operator operated part provided with a hand engaging portion and connected with said seat member and said suction valve by means constructed to effect the opening of one after permitting the closing of the other when the operator operated part is moved in either direction and to permit both to be simultaneously closed, means for normally closing said passages in said seat member and for effecting the successive opening of said passages by the movement of said seat member away from its closed position, a stop for arresting the seat member when in closed position, said operator operated part being provided with opposite faces, one of which is exposed at all times to atmospheric pressure and the other of which is exposed to suction when the suction valve is in open position, the differential of said pressures normally holding the suction valve open against the resistance of its yielding means, whereby a movement of the operator operated part in one direction will permit the suction valve to close and move said valve seat away from its stop to open the passages therein successively to secure a graduated application of the brake mechanism by the power actuator and transfer the pressure of said resistance means to the operator operated part in proportion to the decrease of the differential of fluid pressures on opposite faces of the seat member and within the power actuator, and the release of the operator operated part to permit said seat member to return to closed position under the action of said resistance means and close said passages without opening the suction valve will transfer the pressure of said resistance means to said stop while holding the brakes as applied, and permit the operator to remove his hand from the operator operated part, and a further return movement of the operator operated part will open the suction valve to release the brake mechanism and permit the suction valve to be held in open position.

13. In brake mechanism for an automotive vehicle, a power actuator operating by differentials of fluid pressures and comprising a cylinder and a piston therein operatively connected with brake mechanism of the vehicle, the combination with controlling valve mechanism for the actuator comprising among its members a valve casing exterior to the cylinder, a movable support for said valve casing operatively connected with brake mechnism for the vehicle, valve mechanism in said casing including a valve seat member having portions movable with respect to the valve casing and portions in sealing engagement therewith, and provided with a plurality of passages of reduced diameter extending through it for establishing communication between a portion of the actuator cylinder and a pressure source and for equalizing fluid pressures on opposite faces of said seat member when in open position, said seat member having opposite faces of much greater area than said passages and substantially equal, one face being at all times subjected to the higher pressure fluid in a direction tending to move said seat member into open position and the other face being subjected to the highest pressure within said actuator cylinder, yielding resistance means normally holding said seat member in closed position against the higher fluid pressure thereon, and being nearly counterbalanced by said higher fluid pressure when said seat member is exposed to the maximum differential of fluid pressures thereon, and offering material resistance to the movement of said seat member in a direction away from closed position when the fluid pressures on opposite faces of the seat member are equalized, inlet valves normally closing said passages in said seat member, and means for effecting the successive opening of said valves by the movement of said seat member away from its closed position, an operator operated part connected with said seat member, a stop for limiting the movement of the operator operated part with respect to the casing when said seat member has been moved to open all of said passages therein, whereby the movement of said seat member away from its closed position by the operator operated part will open said passages successively to secure a graduated operation of the power actuator and brake mechanism, and transfer the pressure of said resistance means to the operator operated part in proportion to the decrease of the differential of fluid pressures on the opposite faces of the seat member and within the power actuator, and the movement of said operator operated part to bring its stop into engagement with the casing will effect the complete opening of all of said passages to apply the brake mechanism to the full extent of the power of the actuator, and permit the operator to apply his physical force to the movable support for the valve casing to apply the brake mechanism connected therewith.

14. In brake mechanism for an automotive vehicle, provided with an internal combustion engine having a throttle controlled suction passage, a power actuator comprising a cylinder and a piston therein provided with means for connecting it with brake mechanism of the vehicle, the combination with controlling valve mechanism for the actuator comprising a valve casing exterior to the cylinder, a movable support for said valve casing operatively connected with brake mechanism for the vehicle, said valve casing being provided with means for connecting it with the cylinder and independent means for connecting it with the suction passage of the engine and with the atmosphere, a suction valve interposed between said cylinder connection and said suction connection, yielding means acting on said valve in a direction to close it, a valve seat member interposed between said cylinder connection and the atmospheric connection, having portions movable with respect to the valve casing and portions in sealing engagement therewith, and provided with a plurality of passages of reduced diameter extending through it, said seat member having opposite faces of much greater area than said passages and substantially equal, one face being at all times subjected to the atmospheric pressure in a direction tending to move said seat member into open position and the other face being subjected to the highest pressure within the valve casing and a portion of the actuator cylinder connected therewith, yielding resistance means normally holding said seat member in closed position against the atmospheric pressure thereon, and being nearly counterbalanced by said atmospheric pressure when the differential of fluid pressures on said seat member is at maximum, and offering material resistance to the movement of said seat member in a direction away from closed position when the fluid pressures on opposite faces of the seat member are equalized, an operator operated part connected with said seat member and said suction valve by means constructed to effect the movement of one into open position after permitting the closing of the other when the operator operated part is moved in either direction and to permit both to be simultaneously closed, means normally closing the passages in said seat member and constructed to effect the successive opening of said passages by the movement of said seat member away from its closed position, a stop for arresting the seat member when in closed position, the operator operated part being constructed to normally hold the suction valve in open position, and a stop for limiting the movement of the operator operated part with respect to the casing when said valve seat member has been moved to open all of said passages, whereby the movement of said operator operated part in one direction will permit the lower pressure valve to close and move said valve seat member away from its stop to open said passages successively to secure a graduated operation of the power actuator and brake mechanism, and transfer the pressure of said resistance means to the operator operated part in proportion to the decrease of the differential of fluid pressures on the opposite faces of said seat member and within the power actuator, and the movement of said operator operated part to bring its stop into engagement with the casing will effect the complete opening of all of said passages to apply the brake mechanism to the full extent of the power of the actuator, and permit the operator to apply his physical force to the movable support for the valve casing to apply the brake mechanism connected therewith.

15. Valve mechanism for controlling the operation of power actuators comprising among its members a valve casing, a valve seat member having portions movable with respect to the valve casing, and portions in sealing engagement therewith, and provided with a passage of reduced diameter extending through it for establishing communication between a source of higher pressure and a portion of the power actuator controlled thereby and for equalizing fluid pressures on opposite faces of said seat member when in open position, said seat member having opposite faces of much greater area than said passage and substantially equal, one face being at all times subjected to the higher fluid pressure in a direction tending to move said seat member into open position and the other face being subjected to the highest pressure within said power actuator, yielding resistance means normally holding said seat member in closed position against the higher fluid pressure thereon, and offering material resistance to its movement in a direction away from closed position when the fluid pressures on opposite faces of the seat member are equalized, an operator operated part connected with said seat member, and means for normally closing said passage in said seat member, constructed to be opened by the movement of said seat member away from its closed position, whereby when said seat member is moved away from its closed position said passage will be opened to effect the operation of the power actuator, and the pressure of said resistance means will be transferred to the operator operated part in proportion to the decrease of the differential of fluid pressures on opposite faces of the seat member and within the power actuator.

16. In brake mechanism for an automotive vehicle provided with an internal combustion engine having a throttle controlled suction passage, and a power actuator comprising a cylinder and a piston therein operatively connected with brake mechanism for the vehicle, the combination of controlling valve mechanism for the actuator comprising among its members a valve casing provided with means for connecting it to said cylinder, and independent means for connecting it with said suction passage and with the atmosphere, a suction valve interposed between the said cylinder connection and said suction connection, said valve having its diameter only slightly in excess of that of the passages which it controls and being subjected when closed to the maximum differential of fluid pressures on its opposite faces tending to hold it closed, light yielding means acting on said valve in a direction to close it when opened, an air inlet valve seat member interposed between said cylinder connection and the atmospheric connection, having portions movable with respect to the valve casing and portions in sealing engagement therewith, and provided with a plurality of passages of reduced diameter extending through it, said seat member having opposite faces of much greater area than said passages, and substantially equal, one face being at all times subjected to atmospheric pressure in a direction tending to move said seat member into open position, and the other face being subjected to the highest pressure within the valve casing and the portion of the actuator cylinder connected therewith, yielding resistance means normally holding said seat member in closed position against the atmospheric pressure thereon and being nearly counterbalanced by said atmospheric pressure when the differential of fluid pressures on said seat member is at maximum, and offering material resistance to the movement of said seat member in a direction away from closed position when the fluid pressures on opposite faces of the seat member are equalized, an operator operated part connected with said seat member and said suction valve by means constructed to effect the opening of one after permitting the closing of the other when the operator operated part is moved in either direction, and to permit both to be simultaneously closed, a series of separate inlet valves normally closing said passages in the seat member and movable with and with respect to the seat member, yielding means for seating said inlet valve, said inlet valves being provided with valve stems having stops thereon, arresting means for engaging said stop when the seat member is moved away from closed position, to open said inlet valves, the stops on the respective valve stems and the arresting means therefor being constructed to effect the opening of the inlet valves successively, a stop for arresting the seat member when in closed position, the operator operated part having opposite faces exposed to fluid pressures, the differential of which when the suction valve is opened is exerted on the operator operated part in a direction to hold said valve open and with sufficient force to overcome the resistance spring for said valve, whereby a movement of the operator operated part in one direction will permit the suction valve to close under the action of its spring and move said valve seat away from its stop to open said passages successively and transfer the pressure of said resistance means to the operator operated part in proportion to the decrease of the differential of fluid pressures on opposite faces of the seat member and within the power actuator, and the release of the operator operated part will permit the resistance means to return said seat member to closed position without opening the suction valve, and transfer the pressure of said resistance means to said stop while holding the brake mechanism applied, and a further return movement of the operator operated part will effect the opening of the suction valve and the release of the brake mechanism and hold the suction valve in open position.

17. In brake mechanism for automotive vehicles, a power actuator operated by differential of fluid pressures and comprising a cylinder and a piston therein provided with means for connecting it with brake mechanism of the vehicle, the combination with controlling valve mechanism for the actuator comprising a valve casing exterior to the cylinder, and provided with means for connecting it with the cylinder and independent means for connecting it with sources of higher and lower pressures, a lower pressure valve interposed between said cylinder connection and said lower pressure connection, yielding means acting on said valve in a direction to close it, a valve seat member interposed between said cylinder connection and the higher pressure connection, having portions movable with respect to the valve casing and portions in sealing engagement therewith and provided with a plurality of passages of reduced diameter extending through it, said seat member having opposite faces of much greater area than said passages and substantially equal, one face being at all times subjected to the higher fluid pressure in a direction tending to move said seat member away from closed position and the other face being subjected to the highest pressure within the valve casing and the portion of the actuator cylinder connected therewith, yielding resistance means normally holding said seat member in closed position against the higher fluid pressure thereon and being nearly counterbalanced by said higher fluid pressure when the differential of fluid pressures on said seat member is at maximum, and offering material resistance to the movement of said seat member in a direction away from closed position when the fluid pressures on opposite faces of the seat member are equalized, an operator operated part connected with said seat member and said lower pressure valve by means constructed to effect the movement of one into open position after permitting the closing of the other when the operator operated part is moved in either direction and to permit both to be simultaneously closed, means normally closing the passages in said seat member and constructed to effect the successive opening of said passages by the movement of said seat member away from its closed position, a stop for arresting the seat member when in closed position, the operator operated part being constructed to normally hold the suction valve in open position, whereby when said seat member is moved away from its closed position by the operator operated part, said passages will be opened successively to secure a graduated operation of the power actuator and brake mechanism, and the pressure of said resistance means will be transferred to the operator operated part in proportion to the decrease of the differential of fluid pressures on opposite faces of the seat member and within the power actuator, and the relase of the operator operated part will permit the resistance means to return said seat member to closed position without opening the lower pressure valve and transfer the pressure of said resistance means to said stop while holding the brakes applied, and a further return movement of the operator operated part will effect the opening of the lower pressure valve and the release of the brake mechanism and hold the lower pressure valve in open position.

18. Valve mechanism for controlling the operation of power actuators comprising among its members a valve casing, a valve seat member having portions movable with respect to the valve casing and portions in sealing engagement therewith, said valve mechanism being provided with a plurality of passages of reduced diameter for establishing communication between source of higher pressure and a portion of the power actuator controlled thereby and for equalizing fluid pressures on opposite faces of said seat member when in open position, said seat member having opposite faces of much greater area than said passages and substantially equal, one face being at all times subjected to the higher fluid pressure in a direction tending to move said seat member into open position and the other face being subjected to the highest pressure within said power actuator, yielding resistance means normally holding said seat member in closed position against the higher fluid pressure thereon and offering material resistance to its movement in a direction away from closed position when the fluid pressures on opposite faces of the seat member are equalized, an operator operated part connected with said seat member, means normally closing said passages, constructed to effect the opening of said passages successively by the movement of said seat member away from its closed position, whereby when said seat member is moved away from its closed position said passages will be opened successively to secure a graduated operation of the power actuator, and the pressure of said resistance means will be transferred to the operator operated part in proportion to the decrease of the differential of fluid pressures on opposite faces of the seat member and within the power actuator.

19. In automotive vehicle brake mechanism operated by a power actuator working on differentials of fluid pressure, the combination with valve mechanism for controlling the differentials of pressure in said actuator comprising a casing, a member having portions movable with respect to said casing, means normally acting to bias said portions in one direction, means for creating differentials of fluid pressure on opposite sides of said member, operator operated means for moving said portions in a direction opposite the action of said biasing means, and means acting upon movement of said portions in a direction opposite the action of said biasing means to gradually nullify the differentials of means whereby the force of the biasing means is gradually imparted to the operator-operated means to indicate the amount of pressure being exerted by the actuator on the brake mechanism.

20. In automotive vehicle brake mechanism operated by a power actuator on differentials of fluid pressure, the combination with valve mechanism for controlling the differentials of pressure in said actuator comprising a casing, a member having portions movable with respect to said casing, means normally acting to bias said portions in one direction, means for creating differentials of fluid pressure on opposite sides of said member, operator operated means for moving said portions in a direction opposite the action of said biasing means, means acting upon movement of said operator operated means in a direction opposite the action of the biasing means to disconnect the lower pressure from one side of said member, and means acting upon further movement of said operator operated part in the same direction to gradually admit a higher pressure fluid to said side to nullify said differentials of pressure, and throw the force of said biasing means on the operator operated means to indicate the amount of pressure being exerted by the actuator on the brake mechanism.

21. In a braking system for automotive vehicles, a plurality of brake mechanisms one of which is actuated by power means, valve mechanism for controlling power to said power actuated brake mechanism, and a hand lever supporting said valve mechanism and operatively connected to other of said brake mechanisms.

22. In a braking system for automotive vehicles, a plurality of brake mechanisms one of which is actuated by power means, valve mechanism for controlling power to said power actuated brake mechanism, including an operating handle, and a hand lever operatively connected to other of said brake mechanisms and adapted to be operated by said handle when the valve mechanism has been fully operated to apply the power brake mechanism.

In testimony whereof we affix our signatures.

CALEB S. BRAGG.
VICTOR W. KLIESRATH.